United States Patent [19]

Thien et al.

[11] Patent Number: 5,360,694
[45] Date of Patent: Nov. 1, 1994

[54] THERMAL DYE TRANSFER

[75] Inventors: Tran V. Thien, Harlow; Ranjan C. Patel, Little Hallingbury, both of Great Britain

[73] Assignee: Minnesota Mining and Manufacturing Company, St. Paul, Minn.

[21] Appl. No.: 138,591

[22] Filed: Oct. 18, 1993

[51] Int. Cl.$^5$ .......................... G03C 3/00; B41M 5/035
[52] U.S. Cl. .................................. 430/200; 450/201; 450/945; 503/227
[58] Field of Search ...................... 430/200, 201, 945; 503/227; 544/249

[56] References Cited

U.S. PATENT DOCUMENTS

| | | | |
|---|---|---|---|
| 3,185,538 | 5/1965 | Voltz et al. | 544/249 |
| 4,224,071 | 9/1980 | Buell | 544/249 |
| 4,942,141 | 7/1990 | DeBoer et al. | 430/945 |
| 5,019,549 | 5/1991 | Kellogg et al. | 430/201 |
| 5,156,938 | 10/1992 | Foley et al. | 430/200 |
| 5,190,849 | 3/1993 | Santoh et al. | 430/945 |
| 5,232,817 | 8/1993 | Kawakami et al. | 430/201 |

OTHER PUBLICATIONS

Bello et al. "Near–infrared . . . " J. Chem. Soc. Chem. Commun. pp. 452–454 (Mar.–Apr. 1993).

*Primary Examiner*—Charles L. Bowers, Jr.
*Assistant Examiner*—Martin Angebranndt
*Attorney, Agent, or Firm*—Gary L. Griswold; Walter N. Kirn; Mark A. Litman

[57] ABSTRACT

A method of forming an image in which a color donor element and a receiving element are placed in face-to-face contact and opposed imagewise to infrared radiation, e.g. by laser exposure, in which at least one of the donor and receptor elements comprises a near-infrared absorbing dye which is a squarilium dye having dihydroperimidine terminal groups.

12 Claims, No Drawings

THERMAL DYE TRANSFER

FIELD OF THE INVENTION

This invention relates to thermal transfer imaging and to elements for use therein which contain perimidine squaraine dyes which absorb in the near-infrared and find utility in thermal transfer imaging.

BACKGROUND TO THE INVENTION

Thermal transfer systems have been developed in recent years to cater to the demand of instant access color hard copies of pictures generated electronically by solid state video cameras and the like. Thermal media also find application in color proofing for graphic arts. Thermal transfer imaging involves imagewise transfer of colourants from a donor to a receptor sheet under the action of heat, the donor and receptor sheets being maintained in intimate face-to-face contact, generally through the application of pressure or vacuum. This type of imaging has become increasingly popular because thermal media offer the advantages that they can be handled in daylight, do not require wet processing, generate no polluting effluent and are therefore compatible with the office or home environment.

A color scanner is used to achieve color separation of a picture into its red, green and blue constituents (or its cyan, magenta, and yellow substituents, with an optionally prefered black component). These color separated images are converted into electrical signals which can be operated upon and manipulated. In a known system, these signals are then fed to a thermal printer to drive the thermal print heads. To obtain the print, a colourant donor element, e.g. in the form of a ribbon, with sequentially printed yellow, magenta and cyan color blocks is placed in face-to-face contact with a receiving element and the resulting composite passed between a thermal print head and a platen roller. Imagewise heating is provided by the thermal print head which consists of a number of resistive elements deposited by a thin film process onto a substrate, e.g. alumina and arranged in a linear array. Each approximately square element of the thermal print head is independently addressable by virtue of multiple input lines and logic circuitry on the head. Printing is carried out by energising the head with electrical signals corresponding to the image. The process is repeated for each of the primary colours.

Thermal transfer processes using print heads suffer the drawbacks of low resolution due to the difficulty and cost of fabricating smaller and smaller heating elements, easy soiling of the head and shortened life due to constant contact with the donor element. Under pressure and at the elevated operating temperatures, the head tends to stick to the base of the donor sheet.

Another method of obtaining color hard copies from electronic signals is to use a coherent light source such as a laser to apply imagewise heating to a donor element containing a radiation absorber. Upon exposure to a laser, the light absorber converts light energy into thermal energy and transfers the heat to the matrix in the immediate vicinity, thus increasing the mobility of the colourant for transfer to the receiving element. The light absorbing material may be present in a layer beneath the colourant and/or in admixture with it. The laser beam is modulated by electronic signals which are representative of the shape and color of the original image causing localised heating and imagewise transfer of the three primary colors or complemetary colors (and optionally black) in sequence to reconstruct the original image. Laser-induced thermal colourant transfer is advantageous in that it is a non-impact printing method and has high resolution capabilities. Colors other than these conventional imaging colors may be used such as fluorescent colors, metallics. white, grey, and custom colors.

Examples of thermal transfer media are disclosed in GB-A-1385533, GB-A-2083726; EP-A-403932, EP-A-403933, EP-A-403934, EP-A-404042, EP-A-405219, EP-A-405296, EP-A-407744, EP-A-407907, EP-A-408891, EP-A-408908; U.S. Pat. No. 3,787,210, U.S. Pat. No. 3,946,389, U.S. Pat. No. 4.541.830, U.S. Pat. No. 4,602,263, U.S. Pat. No. 4,788,128, U.S. Pat. No. 4,904,572, U.S. Pat. No. 4,912,083, U.S. Pat. No. 4,942,141, U.S. Pat. No. 4.948.776, U.S. Pat. No. 4,948,777, U.S. Pat. No. 4.948.778, U.S. Pat. No. 4,950,639, U.S. Pat. No. 4,950,640, U.S. Pat. No. 4,952,552, U.S. Pat. No. 4,973,572; WO88/04237; JP-21075292, JP-30043294, JP-51088016, JP-56082293, JP-63319191 and JP-63319192.

A slightly different arrangement in which the infrared absorber is situated in the receiving element rather than in the donor element is disclosed in JP-04278390, JP-04153087 and PCT/GB92/01489.

A wide variety of materials suggested as radiation absorbers include carbon black, as disclosed in GB-A-2083726, and a wide range of visible and infrared absorbing dyes such as phthalocyanines (U.S. Pat. No. 4,788,128), ferrous complexes (U.S. Pat. No. 4,912,083), squarylium dyes (U.S. Pat. No. 4,942,141), chalcogenopyrylo-arylidene dyes (U.S. Pat. No. 4,948,776), bis(chalcogenopyrylo)polymethine dyes (U.S. Pat. No. 4,948,777), oxoindolizine dyes (U.S. Pat. No. 4.948.778), bis(aminoaryl) polymethine dyes (U.S. Pat. No. 4,950,639), tetraaryl polymethine dyes, merocyanine dyes (U.S. Pat. No. 4,950,640), anthraquinone and naphthoquinone derived dyes (U.S. Pat. No. 4,952,552), cyanine dyes (U.S. Pat. No. 4,973,572 and JP-02173291), bridged cyanine dyes (JP-04169289), trinuclear cyanine dyes (EP-A-403933), pyrrocoline dyes (JP-04161382 and JP-04169290), oxonol dyes (EP-A-403934 and U.S. Pat. No. 5,035,977), indene-bridged polymethine dyes (EP-A-407744), nickeldithiolene dyes (EP-A-408908), chromylium squaraine dyes (WO92/09661 and EP-A-511381), thiopyrylium squaraine dyes (U.S. Pat. No. 5,019,549), thiochromylium squaraine dyes (JP-04153086), polyisothianaphthene dyes (JP-022064), indoaniline and azomethine dyes (JP-04173290), indoaniline methide dyes (JP-04189590), tetraarylaminium radical cation dyes (WO90/12342) and metallized quinoline indoaniline dyes (JP-04153086). Squarylium dyes or squaraines have been disclosed previously as infrared absorbers in thermal transfer media, e.g. U.S. Pat. No. 4,942,141, U.S. Pat. No. 5,019,549, EP-A-511381, JP-04153086, JP-63319191 and JP-63319192.

A problem that can arise with laser addressed thermal dye transfer is co-transfer of the radiation absorber with the colourant. Since most dyes absorb to some extent in the visible region of the spectrum, any contamination of the transferred image can result in an inaccurate color rendition. There is a continuing need for near-infrared absorbing materials that are colourless or show minimal absorption in the visible spectrum.

EP 0478052 discloses infra-red sensitive liquid-crystalline polyesters for optical data storage purposes in which a dye is covalently bonded to a liquid crystalline polyester. Suitable dyes include squarilium dyes having dihydroperimidine terminal groups. This class of dyes is also disclosed in J.Chem. Soc., Chem.Commun. 1993 pages 452–454. There is no disclosure of the use of these dyes in thermal dye transfer.

BRIEF SUMMARY OF THE INVENTION

According to one aspect of the present invention there is provided a method of forming an image comprising the steps of:

(i) assembling in intimate face-to-face contact a colourant donor element and a receiving element, and (ii) exposing the assembly to an imagewise pattern of infrared radiation, in which at least one of the donor and receptor elements comprises a near-infrared absorbing dye having a nucleus of the general formula:

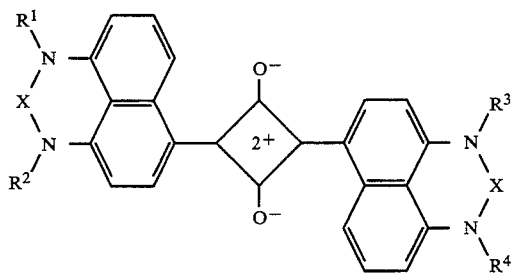

wherein;

R$^1$ to R$^4$ are groups independently selected from hydrogen, alkyl, cycloalkyl, aralkyl, carboalkoxyalkyl and carboaryloxyalkyl, any of which groups may be substituted, X represents >CR$^5$R$^6$, >POR$^7$, or >BOR$^7$ wherein;

R$^5$ and R$^6$ are groups independently selected from alkyl, cycloalkyl and aryl, any of which groups may be substituted, or R$^5$ and R$^6$ together represents the necessary atoms to complete a 5-, 6- or 7-membered ring, and R$^7$ represents an alkyl group which may be substituted.

DESCRIPTION OF PREFERRED EMBODIMENTS

Preferably R$^1$ to R$^4$ are independently selected from hydrogen; a substituted or unsubstituted alkyl or cycloalkyl group having from 1 to 20 carbon atoms; an aralkyl group such as benzyl, p-dodecylbenzyl; carboalkoxyalkyl with the alkoxy group containing from 1 to 20 carbon atoms such as carbethoxymethyl, carbooctyloxymethyl; and a carboaryloxyalkyl group such as carbo(p-dodecylphenoxy)methyl. Dyes in which one or more of R$^1$ to R$^4$ are other than hydrogen show enhanced solubility.

Preferably R$^5$ and R$^6$ are independently selected from hydrogen, an alkyl or cycloalkyl group containing from 1 to 20 carbon atoms, a substituted or unsubstituted aryl group or R$^5$ and R$^6$ together form a 5 to 7-membered nucleus, e.g. heterocyclic, carbocyclic.

R$^7$ preferably represents an alkyl group of 1 to 20 carbon atoms.

It will be readily appreciated that the dyes of formula (I) may be represented by a number of different resonance structures, reflecting the many different ways in which the delocalised π-electron system may be visualised and notated. In formula (I) and elsewhere in this specification, the moiety:

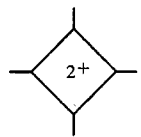

represents the aromatic dication derived from cyclobutadiene. This particular notation is chosen for convenience, and allows both the end groups and the central portion of the dye molecule to be depicted in fully aromatised form. It must be emphasised, however, that formula (I) is to be interpreted as including all the possible resonance forms, such as:

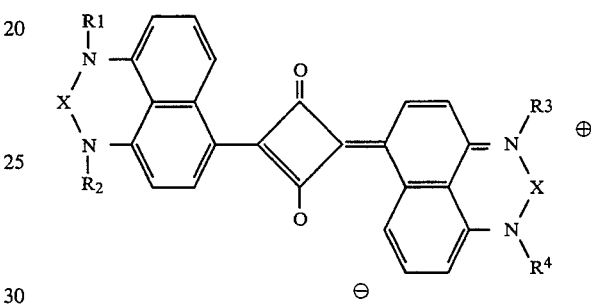

and the like.

The invention also provides colourant donor elements and receptor elements comprising an infrared dye of formula (I).

The near-infrared dyes may be present within the layer of transferable colourant itself or in an underlayer thereto, or may be present in a layer coated on the receptor element, or may be in more than one of these locations. The dyes of formula (I) have negligible absorption in the visible part of the spectrum and are particularly suitable for inclusion within the colourant layer or in the receptor layer, where the risk of contaminating the final image is greatest.

The dyes may be used in any amount effective for the intended purpose. Generally, they are present in an amount sufficient to provide an optical density of at least 0.5 at the wavelength of the exposing radiation (which is typically within the range 700 to 900 nm), preferably at least 1.0 and most preferably at least 1.5. When present in the colourant layer, concentrations of 0.1 to 10% by weight of the total solids, preferably 1 to 5%, have proved suitable.

It is generally accepted in the field of the present invention to allow substantial substitution on the core dye structure of the present invention. Some types of substitution, especially that which improves solubility in a selected solvent, is particularly desirable. Where the term "group" or "central nucleus" is used in describing an aspect of the present invention, that term imolies that any type of substitution is acceptible, as long as the basic structure is maintained. For example, "alkyl group" would include not only standard hydrocarbon alkyls such as methyl, ethyl, cyclohexyl, iso-octyl, undecyl, etc., but would also include substituted alkyl such as hydroxymethyl, omega-cyanopropyl, 1,2,3-trichlorohexyl, 1-carboxy-iso-octyl, phenyldecyl, and the like. The term "alkyl" or "alkyl moiety" indicates that there is no substitution on that defined component.
The infrared absorbing dyes of formula (I) may be synthesised by procedures similar to those described in Dyes & Pigments Vol. 11, pp. 21 to 35.
Examples of dyes of the invention include:
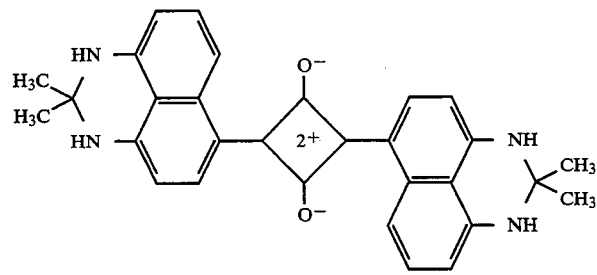
1
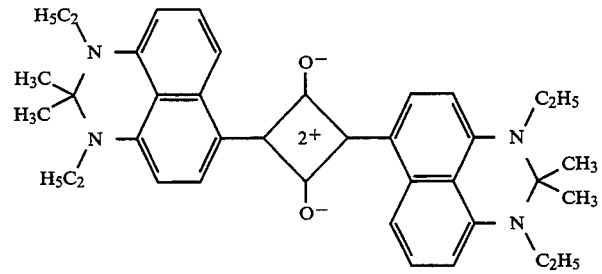
2
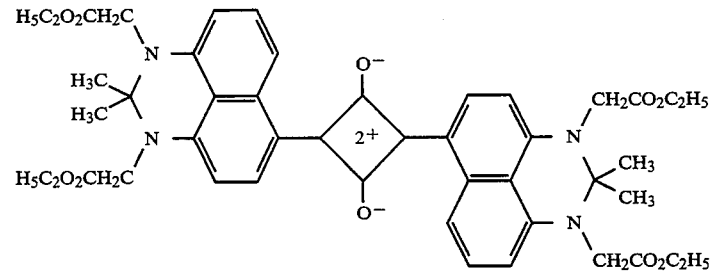
3
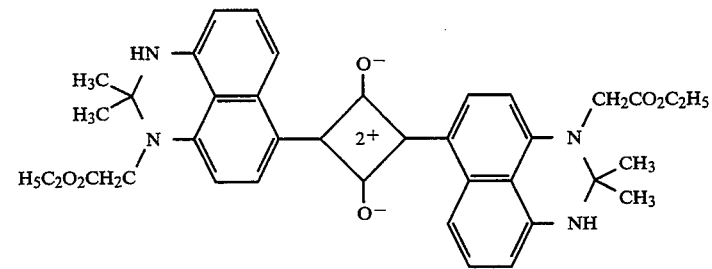
4
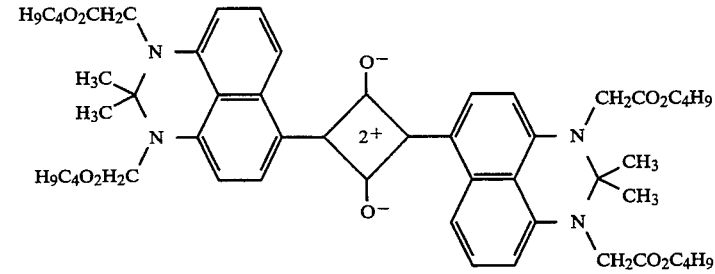
5

-continued
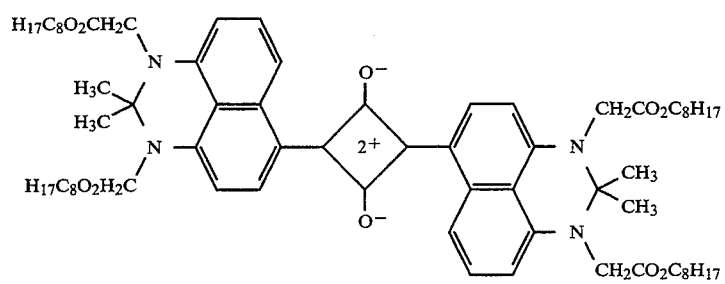
6
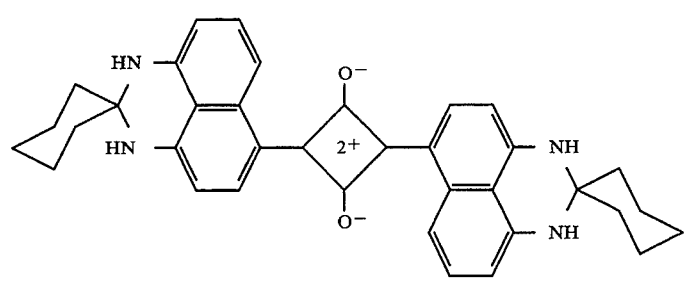
7
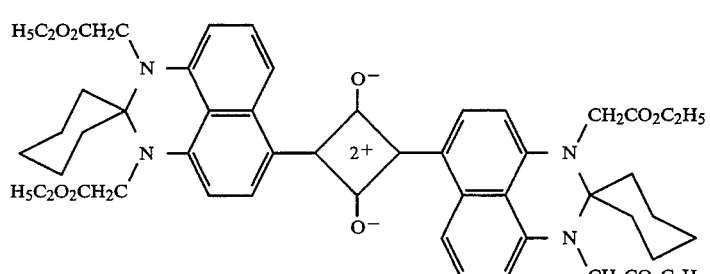
8
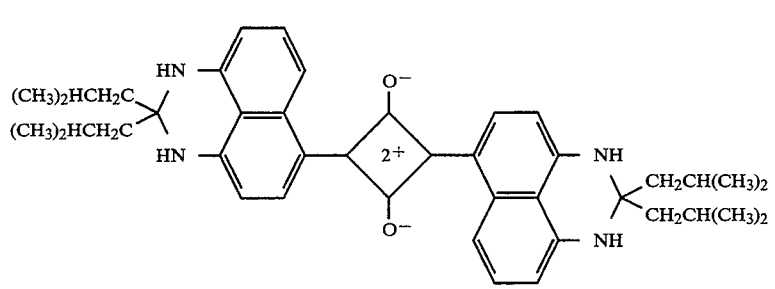
9
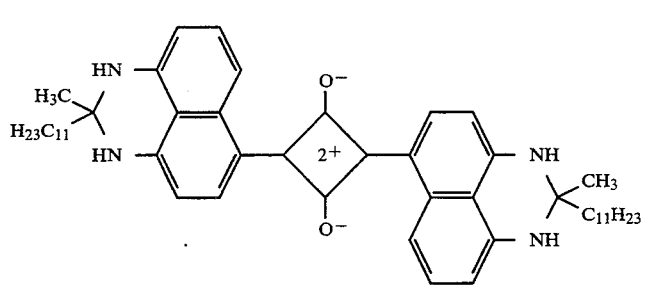
10

-continued

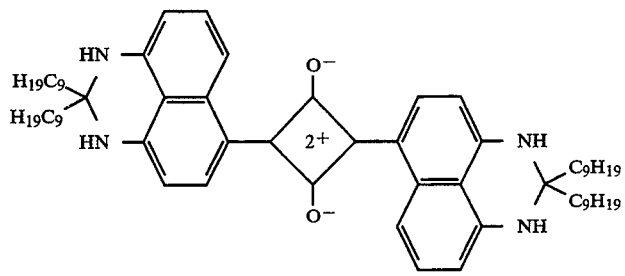

11

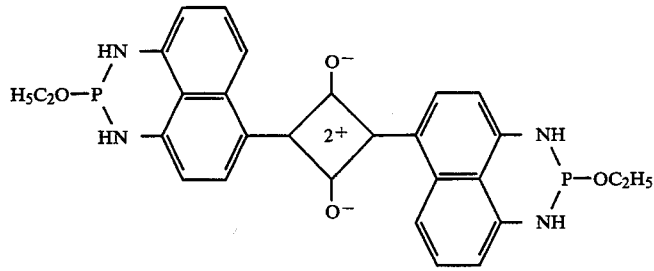

12

There are basically two types of thermal media: mass transfer media and the more energy intensive dye diffusion transfer media. The dyes of the present invention find use in both types. With conventional mass transfer, tone is limited to being bilevel (not continuous tone). Dot density cannot be varied because the entire ink layer peels off the base film during heating. Density modulation or dot pattern methods are used to achieve gradation. In the dye sublimation or dye diffusion transfer method, only the colourant is transferred to the receiving element leaving the binder (if any) behind on the donor sheet. The colourant dye is transferred to the receptor in an amount proportional to the input energy. Thus, it is capable of giving a continuous tone image. Although some dyes such as styryl yellow and tricyanovinyl magenta do transfer through the vapour phase via sublimation, the majority of dyes are believed to transfer via diffusion. The colourant usually is originally in the form of a solid solution of dye in the binder of the donor element. As the temperature rises during printing, the dye is partitioned and in thermal equilibrium between the binder polymer on the donor and the receiver polymer on the receptor. Such equilibrium heating is capable of achieving continuous tone images. The quantity of dye transferred, and thus the intensity of color generated at each image point is controlled by the temperature at the ribbon/receptor interface. Eutectic mixtures of dyes can lower the melting point and thus facilitate dye transfer, as disclosed in U.S. Pat. No. 4,857,503.

Mass transfer donor media have the ability to transfer essentially zero or 100% of the colourant from an irradiated area depending on whether the input energy is below or above a given threshold. This is frequently achieved by having the colourant dye or pigment dispersed in a low-melting waxy binder layer so that in irradiated areas the entire layer transfers to the receptor in a molten state, as described, for example, in JP-63-319192. Alternatively, the binder or some other ingredients of the colourant layer may decompose thermally (e.g. by an acid-catalysed process) to gaseous products which serve to propel the colourant, with or without the other constituents, towards the receptor. This type of media is described in WO92/06410 and WO92/12342.

Mass transfer colourant layers comprising a binder, a pigment, and a fluorochemical additive, as described in British Patent Application No. 9225724.5 are particularly suitable for use in this invention.

Any colourant can be used in the donor layer provided it is transferable under the action of heat, without decomposing. "Colourant" is used herein in its broadest sense, to encompass any material capable of modifying the appearance of the receptor. The colourant may comprise a group capable of reacting chemically with some other species already present in the receptor layer to form covalent bonds, e.g. to drastically reduce the mobility of the transferred dyes and prevent dye migration and/or resublimation.

A very large number of dyes and pigments are known in the art of thermal colourant transfer, and all are potentially useful in the present invention. Lists of suitable dyes may be found, for example, in U.S. Pat. No. 4,541,830, U.S. Pat. No. 4,695,287, U.S. Pat. No. 4,698,651, U.S. Pat. No. 4,701,439, U.S. Pat. No. 4,743,582, U.S. Pat. No. 4,748,149, U.S. Pat. No. 4,753,922, U.S. Pat. No. 4,757,046, U.S. Pat. No. 4,769,360, U.S. Pat. No. 4,973,572, U.S. Pat. No. 5,017,547, U.S. Pat. No. 5.023.229, U.S. Pat. No. 5,024,990, U.S. Pat. No. 5,026,678, U.S. Pat. No. 5,026,679, U.S. Pat. No. 5,043,317, U.S. Pat. No. 5,126,312, U.S. Pat. No. 5,126,313 and U.S. Pat. No. 5,125,314. Dyes which match the proofing ink references provided by the International Prepress Proofing Association are particularly useful, as disclosed in U.S. Pat. No. 5,024,990. Dye selection is based on a variety of factors, such as the desired hue, stability towards heat and light, tinctorial strength, solubility, thermal mobility, etc. Suitable dyes are frequently found in classes such as the azos, tricyanostyryls, anthraquinones, but this is by no means an exhaustive list, and nor would every member of these classes be suitable. The above dyes may be employed singly or as mixtures to obtain a monochrome of a desired hue. The dyes may be used at a coverage of from about 0.05 to about 1 g/m² and are preferably hydrophobic. Pigments of the types commonly used in printing inks and conventional color proofing media are suitable for use in mass transfer donor media.

The donor elements of the present invention normally comprise a support having coated on at least one major surface thereof the donor layer containing the colourant and the radiation absorber, although the donor layer may alternatively comprise self-supporting film, e.g. as disclosed in EP-A-491564, or the radiation absorber may be present in an underlayer, as disclosed in JP-63319191 and WO92/06410.

The heat transferable colourant and infrared absorbing material are preferably dispersed in a polymeric binder. The binder may comprise any of a number of suitable materials, including (but not limited to): poly(vinylacetals), such as poly(vinylformal), poly(vinylbutyral), etc.; a cellulose derivative, such as cellulose acetate hydrogen phthalate, cellulose acetate, cellulose acetate propionate, cellulose acetate butyrate, cellulose triacetate, etc.; polycarbonate; poly(styreneacrylonitrile); poly(sulfones); poly(phenylene oxide); acrylate and methacrylate polymers and copolymers, vinyl acetate-vinylidene chloride copolymers, waxes having a softening or melting point of about 60° C. to about 150° C., and thermally decomposable polymers such as nitrocellulose. The selection of binder may be dictated by desire for mass transfer or dye-diffusion transfer. The binder may be used at a coating weight of about 0.1 to about 5 g/m$^2$.

Any material can be used as support for the donor elements of the invention provided it is dimensionally stable and can withstand the heat generated during imaging. The support of the donor sheet generally comprises a transparent substrate, e.g. generally a polyester, such as polyethylene terephthalate; polyamide; polyimide; polysulfone; polyethersulphone; polycarbonate; cellulose ester; fluorine polymer, such as, polyvinylidene fluoride, tetrafluoroethylene-hexafluoropropylene copolymer; polyether, such as, polyoxymethylene; polyacetal; or a polyolefin, such as polyethylene, polypropylene and polystyrene. The support typically has a thickness of from 2 to about 100 μm and may comprise a subbing layer, if desired. The backside of the support may be treated with a release agent, which is particularly desirable with thermal print heads, yet still offers some advantages with laser addressable media. Materials such as silicone containing polymers, e.g., polysiloxanes, and poly(silicone-ureas), which are known in the art as release layer materials are highly useful in this regard as backside coating materials.

Depending upon the solubility of the dyes, the colourant layer can be applied to the support either as a solution or a dispersion in a suitable solvent, e.g., lower alcohols, ketones, esters, chlorinated hydrocarbons, and mixtures thereof. Any of the well known coating techniques may be used or the dye donor layer may be printed onto the support by a printing technique, such as gravure printing. The thickness of the donor layer must be sufficient to provide the necessary optical density for both the colourant and the infrared absorber, and will depend on factors such as the extinction coefficient of the colourant and infrared dye and their solubility in the binder. Relatively thin layers of up to 5 μm dry thickness are preferred.

The colourant receiving element usually comprises a support sheet having coated thereon a heat softenable (low Tg, i.e., <100° C.) thermoplastic binder. The support can be made of any material to which the receptor layer can be adhered and includes substrates that are smooth or rough, transparent or opaque, flexible or rigid. Representative examples include polyethylene terephthalate, polyimides, polysulphones, cellulose esters, polycarbonates, polyamides, baryta coated papers, polyethylene coated paper, white polyester with TiO$_2$ pigment incorporated therein, ivory-paper, condenser paper or synthetic paper. The dye image receiving layer may comprise, for example, polycarbonate, polyurethane, polyester, polyvinylchloride, copoly(styrene-acrylonitrile), polycaprolactone, copoly(vinylidene chloride-vinylacetate) or mixtures thereof. In general, the receptor binder is a resin that is a good solvent for the colourant. The binder layer may be present in any amount which is effective for the intended purpose, but good results have been obtained at a concentration of from about 1 to 5 g/m$^2$ on the receptor support. The receptor layer may contain fillers such as titania, zinc oxide and additives such as anti-oxidants, brighteners, ultraviolet light stabilisers or compounds that reduce the mobility of the transferred colourant and prevent its heat-induced migration and/or resublimation.

The donor element of the invention may be used in sheet form or in a continuous roll or ribbon. The ribbon may comprise a support coated with sequentially repeating blocks of cyan, magenta, yellow and black colourants. Non-traditional colours, such as white, grey, brown, metallic, fluorescent or other non-primary colours may also be used.

The donor elements are used to form a full color image by thermal transfer, which process comprises imagewise exposure of each color block with a laser to thermally transfer the colourant to the receptor to form a monochrome image. The process is repeated sequentially and in registration for the other colours.

There are two distinct methods of using radiation to effect thermal transfer of a colourant. In the first method, a laser is scanned directly over the donor assembly, while its intensity is modulated in accordance with digitally stored image information, as disclosed in JP-5188016, U.S. Pat. No. 4,973,572, GB-A-1433025 and GB-A-2083726. The second method involves a flood exposure from a momentary source, such as a xenon flash lamp, through a suitable mask held in contact with the donor receptor assembly, as disclosed in U.S. Pat. Nos. 3,828,359, 4,123,309, 4,123,578, 4,157,412, EP-A-365222 and Research Disclosure No. 142223 (February 1976). Alternatively, a laser may be used in conjunction with a contact mask, as described in British Patent Application No. 9217095.0.

Several different kinds of laser may be used to effect thermal transfer of colourant, including: ion gas laser such as argon and krypton lasers; metal vapour lasers, such as copper, gold and cadmium lasers, solid state lasers such as ruby or YAG lasers, and diode lasers such as gallium arsenide emitting in the near-infrared region from 750 to 870 nm. The choice of the laser depends not only on the ability of the absorber to absorb the radiation but also on the mode of colourant transfer, whether mass, dye sublimation, ablative transfer or dye diffusion transfer. The more powerful dye pumped YAG (Yttrium Aluminum Garnet) laser emitting at 1060 nm is suitable for ablation mass transfer. Unlike equilibrium heating methods such as dye diffusion transfer, a blast from the YAG laser creates a substantial temperature jump and induces a rapid volume expansion which overcomes the adhesion of the spot to the substrate and the cohesion between the spot and the surrounding colder matrix. Such a microexplosion propels the spot with sufficient force to adhere to the receiver sheet. Ablation transfer with an intense laser is more suitable for high contrast, half tone color proofing. Diode lasers are preferred for use with the donor elements of this invention. In practice, they offer significant advantages in terms of their small size, low cost, stability, reliability, ruggedness, and ease of modulation.

The invention will now be described with reference to the following Examples.

EXAMPLE 1

Preparation of Dye No. 10

(a) 2-Methyl-2-undecyl-1,3-dihydroperimidine 1,8-Diaminonaphthalene (7.9 g, 0.05 mole) and 2-tridecanone (12 g, 0.06 mole) were stirred in 50 ml tetrahydrofuran and 50 mg p-toluenesulphonic acid was added. The mixture was refluxed for 30 minutes, then 100 ml toluene was added. The mixture was refluxed for a further hour in a Dean-Stark apparatus to collect the water azeotrope. The residue was diluted with 100 ml diethylether, filtered, evaporated and distilled at the water pump. The 2-methyl-2-undecyl-1,3-dihydroperimidine distilled at 300° C. as a tan viscous oil. Yield 14.5 g (86%).

(b) Perimidine squarylium No. 10 Squaric acid (1.14 g, 0.01 mole) was dissolved in 50 ml boiling n-butane and 2-methyl-2-undecyl-1,3-dihydroperimidine (7 g, 0.021 mole) in 150 ml toluene was added. The mixture was refluxed in a Dean-Stark apparatus and the water azeotrope collected. After 2 hours, the green residue was allowed to cool to room temperature and the dye was precipitated by adding 100 ml petroleum ether, filtered and washed with diethylether. The precipitate was taken up in 50 ml dichloromethane, chromatographed through 100 g silica gel and eluted with diethylether/dichloromethane 1:1. Evaporation of the eluate and recrystallisation of the residue from diethylether-petroleum ether solvent mixture afforded the NIR (near infrared) dye as a black powder, λmax (CH$_2$Cl$_2$): 805 nm, εmax: 143,500. Yield 4.8 g (64%).

Preparation of Dye No. 12

(a) 2-Ethoxy-1,3-dihydro-2-phosphaperimidine The phosphaperimidine was prepared according to K. Pilgram, Tetrah. Lett. 19, 137 (1963). A solution of 1,8-naphthalenediamine (7.9 g, 0.05 mole) and triethylphosphite (8.3 g, 0.05 mole) in 50 ml toluene was refluxed for 2 hours and distilled at the water pump. The compound passed at 210° C. as a tan oil. Yield 5.8 g (50%).

(b) Dye No. 12 Squaric acid (0.57 g, 5 mmole) was first dissolved in 20 ml n-butanol and 2-ethoxyphosphaperimidine (2.4 g, 0.05 mole) was added. The mixture was stirred and refluxed for 30 minutes. The precipitated dye was filtered, washed repeatedly with methanol and dried. Yield 1.72 g (63%).

The other dyes were synthesised in an analogous manner. Dyes with one or more N-substituents were prepared by treatment of the corresponding unsubstituted dye with the appropriate alkyl halide in the presence of mild base.

EXAMPLE 2

Sublimation Media

A stock solution A was prepared by dispersing the following ingredients in a Silverson mixer for 10 minutes:

8 g polyvinylbutyral Butvar TM B76 (10% in MEK)
7.5 g dichloromethane
105 g methylethylketone
1.5 g Aerosil TM OX50 (Degussa)

A stock solution B was prepared by homogenising the following ingredients in a sand mill roller for 30 minutes:

13.1 g ethanol
6.0 g methylethylketone
0.9 g Dye No. 7
0.6 g Dye M-1
0.15 g Dye M-2

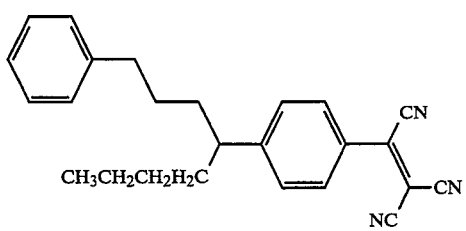

M-1

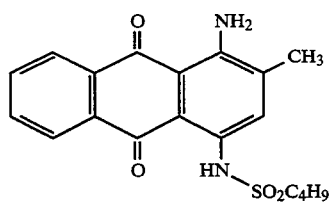

M-2

A dye dispersion was obtained by mixing 7.7 g of stock solution A and 7.0 g of stock solution B and coated with a wire wound KBar No. 4 onto unsubbed polyester (4 MIL, 0.1 mm thickness) and dried in air to provide a dye donor element.

The coating was placed in face-to-face contact with a Hitachi thermal paper and the assembly was taped onto a vacuum drum and addressed with a laser diode emitting at 830 nm, focused to 20 μm spot, delivering 100 mW power and scanned at rates varying from 200 to 600 cm/sec. A brown image was transferred at 200 cm/sec. to the Hitachi paper which converted to a brilliant magenta image on heating with a hot air blower. The transferred O.D. at 570 nm for magenta sublimable dyes was 1.5 and the O.D. at 700 nm which was due to the infrared absorber was 0.1, illustrating that the squarylium dye (if transferred) little contaminates the image color. The best sensitivity achieved was 0.25 J/cm$^2$.

EXAMPLE 3

Mass Transfer Media

A stock solution was prepared by ball milling the following ingredients for 12 hours:

25.0 g 10% Magenta pigment dispersion in VAGH (as described in Example 3 of British Patent Application No. 9225724.5)
1.4 g Dye No. 8
12.0 g dichloromethane To 8.4 g of the stock solution was added 0.1 g of N-methylperfluorooctanesulfonamide. The mixture was ball milled for 30 minutes and the dispersion was coated onto unsubbed polyester (4 mil thickness) with a wirewound Kbar No. 2, dried in air to give a pigmented mass transfer donor element.

The coating was placed in face-to-face contact with a VYNS (vinylidene chloride-vinyl acetate copolymer)

coated Hitachi paper. The donor receptor assemblage was taped onto a vacuum drum and addressed with a laser diode emitting at 830 nm, focused to 20 μm, giving 100 mW power output. The scan rate was varied from 200 to 600 cm/sec. A 100 dots per inch modulated image transfer was readily observed at 600 cm/sec. The best sensitivity achieved was 0.08 J/cm². Furthermore, clear magenta tracks were obtained with minimum contamination of the pigment color by the squarylium dye.

| NIR dye | *O.D. at 570 nm | *O.D. at 830 nm | *O.D. at 700 nm | Best sensitivity at 100 mW (cm/sec) |
|---|---|---|---|---|
| 3 | 1.6 | 1.25 | 0.25 | 400 |
| 9 | 1.6 | 1.90 | 0.40 | 400 |
| 10 | 1.6 | 1.50 | 0.35 | 600 |
| 11 | 1.5 | 1.10 | 0.23 | 600 |

*Optical densities of the donor sheet.

We claim:
1. A method of forming an image comprising the steps of
   (i) providing a colorant donor element comprising a substrate and a layer containing a transferable colorant and a receiving element,
   (ii) assembling in intimate contact a face of said donor element having transferable colorant thereon and a face of said receiving element having a receptor surface, and
   (iii) exposing the donor element and receiving element of step (ii) while in intimate contact to an imagewise pattern of infrared radiation, wherein the improvement comprises providing at least one of the donor and receptor elements with a layer comprising a near-infrared absorbing dye having a nucleus of the general formula:

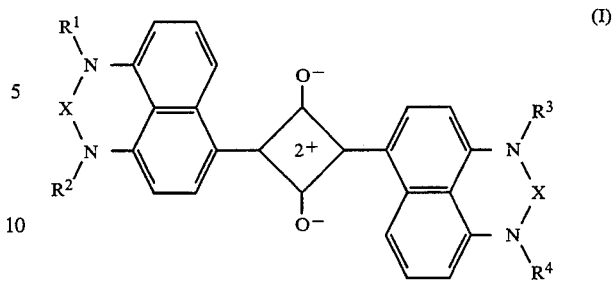

wherein:
$R^1$ to $R^4$ are independently members selected from the group consisting of hydrogen, alkyl, cycloalkyl, aralkyl, carboalkoxyalkyl, and carboaryloxyalkyl group,
X is a member selected from the group consisting of $=CR^5R^6$, $=POR^7$ and $BOR^7$, wherein:
$R^5$ and $R^6$ are independently members selected from the group consisting of alkyl, cycloalkyl and aryl groups, or $R^5$ and $R^6$ together represents the necessary atoms to complete a 5, 6 or 7-membered ring, and
$R^7$ represents an alkyl group.

2. A method according to claim 1 wherein one or more of $R^1$ to $R^6$ represents alkyl or cycloalkyl having up to 20 carbon atoms.

3. A method according to claim 1 wherein one or more of $R^1$ to $R^4$ represents a carboalkoxy alkyl group in which the alkoxy group contains up to 20 carbon atoms.

4. A method according to claim 1 wherein $R^7$ represents an alkyl group of up to 20 carbon atoms.

5. A method according to claim 1 wherein said dye is a member of the group consisting of:

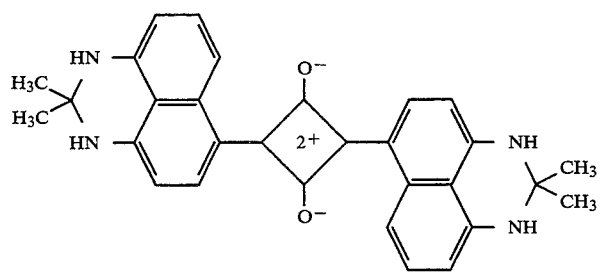

1

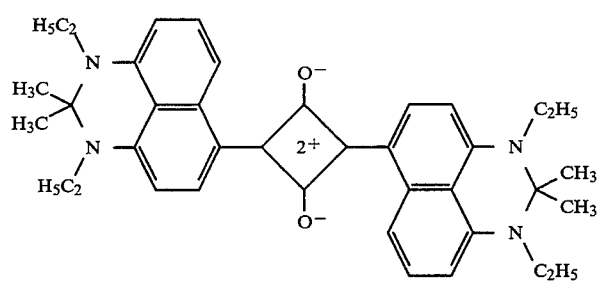

2

-continued
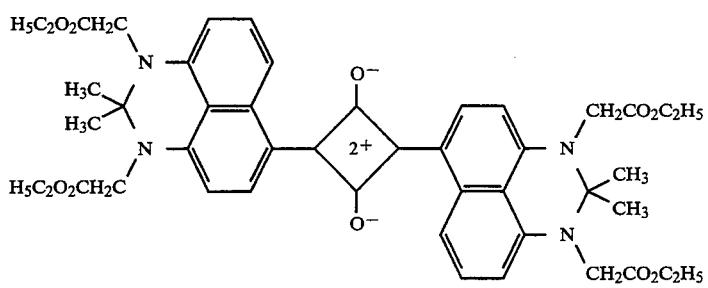
3
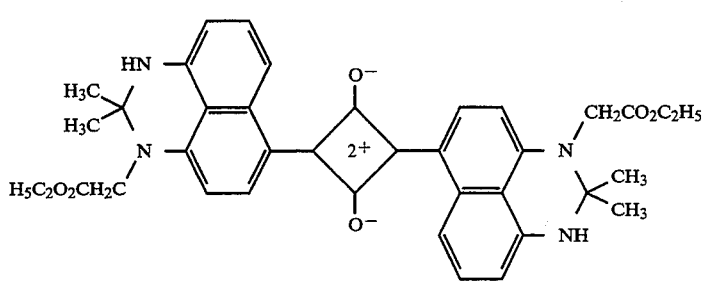
4
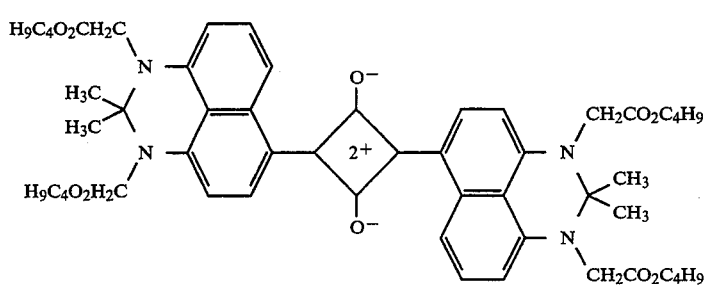
5
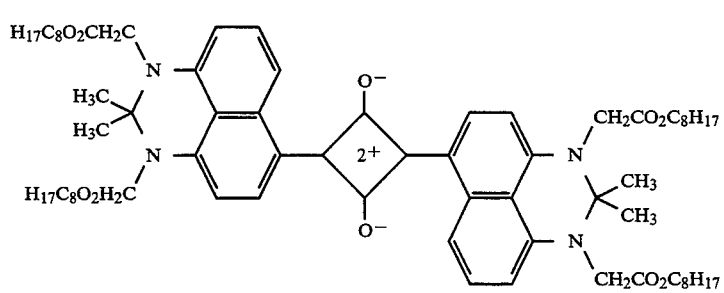
6
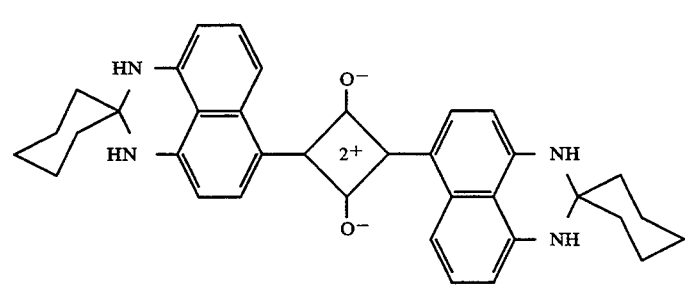
7

-continued

8

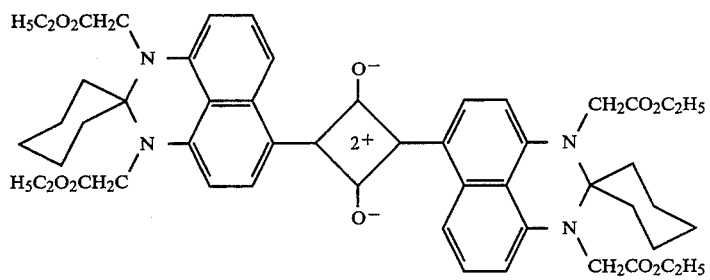

9

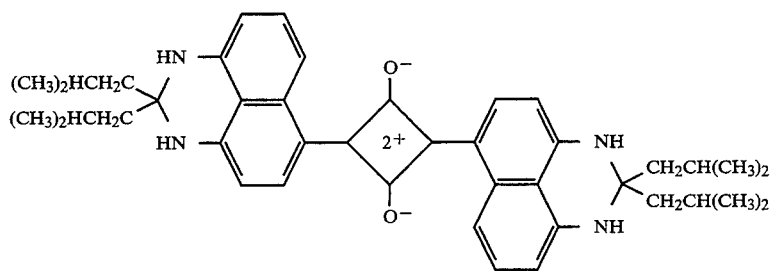

10

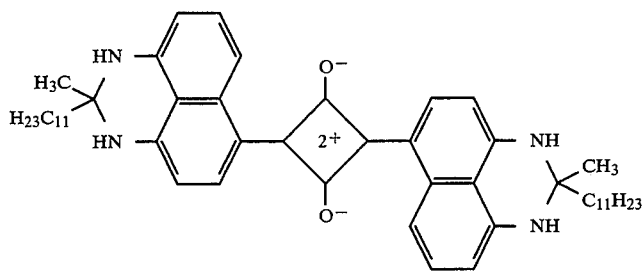

11

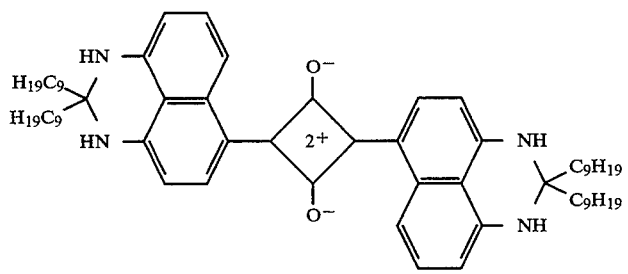

12

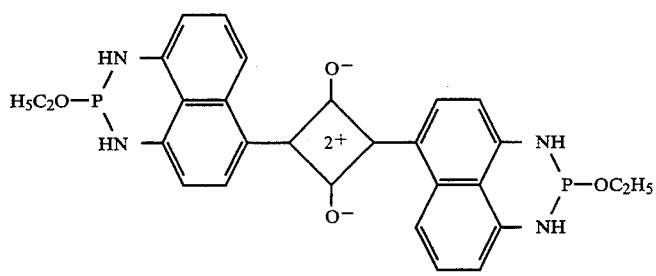

6. A method according to claim 1 wherein said receptor element comprises a substrate having a receptor layer and, as an infrared absorber, within or beneath the receptor layer, said near-infrared absorbing dye.

7. A method according to claim 1 wherein said colourant comprises a layer of transferable colourant and, as an infrared absorber, within the colourant layer or in an adjacent layer, said near-infrared absorbing dye.

8. A method according to claim 7 wherein said dye is present in an amount to provide an optical density of at least 1.0 within the wavelength range 700 to 900 nm.

9. A receptor element for thermal transfer imaging comprising a substrate having a receptor layer wherein the element additionally comprises, as an infrared absorber, within or beneath said receptor layer, a dye having a nucleus of the formula:

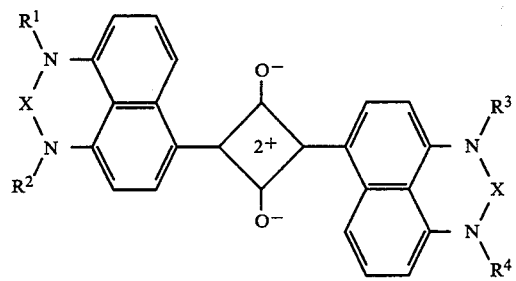

wherein;
- $R^1$ to $R^4$ are independently members selected from the group consisting of hydrogen, alkyl, cycloalkyl, aralkyl, carboalkoxyalkyl and carboaryloxyalkyl groups,
- X is a member selected from the group consisting of $>CR^5R^6$, $>POR^7$ and $>BOR^7$ wherein;
- $R^5$ and $R^6$ are independently members selected from the group consisting of alkyl, cycloalkyl and aryl groups or $R^5$ and $R^6$ together represents the necessary atoms to complete a 5, 6 or 7-membered ring, and
- $R^7$ represents an alkyl group.

10. A receptor element according to claim 9 wherein said dye is present in an amount to provide optical density of at least 1.0 within the wavelength range 700 to 900 nm.

11. A colourant donor element for thermal transfer printing comprising a substrate and a transferable colorant layer, a transferable colorant and, as an infrared absorber, within said colourant layer or in an adjacent layer a dye having a nucleus of the formula:

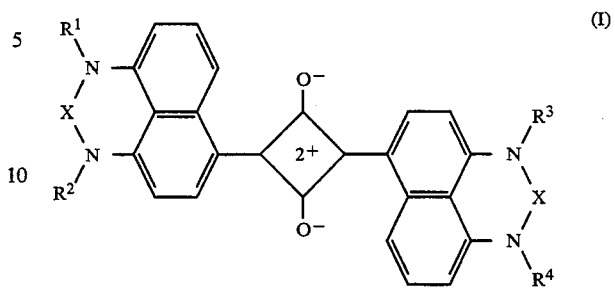

wherein;
- $R^1$ to $R^4$ are independently members selected from the group consisting of hydrogen, alkyl, cycloalkyl, aralkyl, carboalkoxyalkyl and carboaryloxyalkyl group,
- X is a member selected from the group consisting of $>CR^5R^6$, $>POR^7$ and $>BOR^7$, wherein;
- $R^5$ and $R^6$ are independently members selected from the group consisting of alkyl, cycloalkyl and aryl group, or $R^5$ and $R^6$ together represents the necessary atoms to complete a 5,6 or 7-membered ring, and
- $R^7$ represents an alkyl group.

12. A colorant donor element according to claim 11, wherein said dye is present in an amount to provide optical density of at least 1.0 within the wavelength range 700 to 900 nm.

* * * * *